Patented Mar. 31, 1931

1,798,374

UNITED STATES PATENT OFFICE

GEORG FRERICHS, OF BONN, GERMANY, ASSIGNOR TO THE FIRM: SCHERING-KAHLBAUM AKTIENGESELLSCHAFT, OF BERLIN, GERMANY

COLORLESS MOLTEN PRODUCTS FROM PYRAMIDONE AND SOPORIFICS AND METHOD OF MAKING SAME

No Drawing. Application filed July 8, 1926, Serial No. 121,267, and in Germany July 16, 1925.

My invention refers to products obtained by melting 1-phenyl-2,3-dimethyl-4-dimethylamino-5-pyrazolone together with other compounds, more especially CC-substituted barbituric acid.

It is well known to those skilled in the art that if one of these acids is melted together with 1-phenyl-2,3-dimethyl-4-dimethylamino-5-pyrazolone in the proportion of 1 mol of the barbituric acid and 1 or 2 mols of 1-phenyl-2,3-dimethyl-4-dimethylamino-5-pyrazolone, products are obtained which are marked by valuable therapeutical properties, more especially by analgetic effects. If such a mixture is melted at a temperature varying from 110–115° C. a yellow colored melt results. It has now been ascertained that this yellow color is due to the decomposition of part of the 1-phenyl-2,3-dimethyl-4-dimethylamino-5-pyrazolone in consequence of an oxidation brought about by the oxygen of the air.

I avoid the coloring of the melt and obtain a colorless melt according to the present invention by melting the components and allowing the melt to cool down under seclusion of air, preventing the access of oxygen by surrounding the melt with an inert gas such as, for instance, carbon dioxide, hydrogen, nitrogen or the like.

In practising my invention I may for instance proceed as follows:

*Example 1.*—A mixture of 285 grams of diethyl barbituric acid and 715 grams of 1-phenyl-2,3-dimethyl-4-dimethylamino-5-pyrazolone is introduced into a suitable vessel and carbon dioxide gas is introduced with stirring until all the air has been removed from the vessel as well as from its contents. I then heat the pulverulent mixture in the vessel until a limpid melt is obtained. While this melt is cooling down carbon dioxide gas is further introduced and the resulting crystalline mass is absolutely colorless. It begins melting at 95° C. and is soluble in warm water as well as in alcohol, ether and acetone.

*Example 2.*—416 grams of diallyl barbituric acid and 925 grams of 1-phenyl-2,3-dimethyl-4-dimethylamino-5-pyrazolone are treated as described with reference to Example 1. The product obtained begins melting at 88.5° C. and is soluble in warm water as well as in alcohol, ether and acetone.

The same course is followed in melting the components together in other proportions or in melting together other CC-substituted barbituric acids such as dipropyl barbituric acid, isopropyl allylbarbituric acid, isopropyl propenyl barbituric acid, phenyl ethyl barbituric acid etc. with 1 or 2 mols of 1-phenyl-2,3-dimethyl-4-dimethylamino-5-pyrazolone.

This process can be applied generally to all molten products in which 1-phenyl-2,3-dimethyl-4-dimethylamino-5-pyrazolone forms one of the components.

*Example 3.*—In melting together the urethane compound of trichlor ethyl alcohol with 1-phenyl-2,3-dimethyl-4-dimethylamino-5-pyrazolone in the proportion of 1:1, as described with reference to Example 1, there is obtained a compound melting at 73–75° C., which is soluble in ethyl alcohol, methyl alcohol, acetic ether and acetone.

*Example 4.*—If 1 mol brom diethyl acetyl carbamide is melted together with 1 mol of 1-phenyl-2,3-dimethyl-4-dimethylamino-5-pyrazolone, a compound is formed melting at 82–86° C. and being soluble in the organic solvents enumerated with reference to Example 3. The same is true of the product obtained by melting the constituents together in the proportion of 1:2.

Various changes may be made in the details of the operation and particularly in the proportions of the ingredients present in the solutions used without departing from the invention or sacrificing the advantages thereof.

I claim:—

1. The process of preparing colorless products when melting mixtures of 1-phenyl-2,3-dimethyl-4-dimethylamino-5-pyrazolone and a soporific of the class of urea derivatives, comprising surrounding the mixture with an inert gas while melting and during the cooling of the melt.

2. The process of preparing colorless products when melting mixtures of 1-phenyl-2,3-dimethyl-4-dimethylamino-5-pyrazolone and a CC-substituted barbituric acid, comprising surrounding the mixture with an inert gas while melting and during the cooling of the melt.

3. The process of preparing colorless products when melting a mixture of 2 mols of 1-phenyl-2,3-dimethyl-4-dimethylamino-5-pyrazolone and 1 mol of diethyl barbituric acid comprising surrounding the mixture with an inert gas while melting and during the cooling of the melt.

4. As a new product, a solid formed by solidifying a molten mixture of 1-phenyl-2,3-dimethyl-4-dimethylamino-5-pyrazolone and a CC-substituted barbituric acid out of contact with reacting gases, this product being substantially colorless.

5. As a new product, a solid formed by solidifying a molten mixture of 1-phenyl-2,3-dimethyl-4-dimethylamino-5-pyrazolone and a dialkyl barbituric acid out of contact with reacting gases, this product being substantially colorless.

6. As a new product, a solid formed by solidifying a molten mixture of 1-phenyl-2,3-dimethyl-4-dimethylamino-5-pyrazolone and a diethyl barbituric acid out of contact with reacting gases, this product being substantially colorless.

7. As a new product, a solid formed by solidifying a molten mixture of 2 mols of 1-phenyl-2,3-dimethyl-4-dimethylamino-5-pyrazolone and 1 mol of diethyl barbituric acid, this product being substantially colorless.

In testimony whereof I affix my signature.

GEORG FRERICHS.